March 6, 1934.   F. T. STOCKDALE   1,949,847
COAL CONVEYER
Filed July 23, 1932
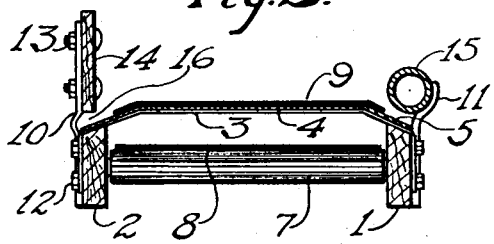
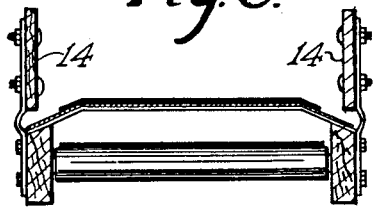
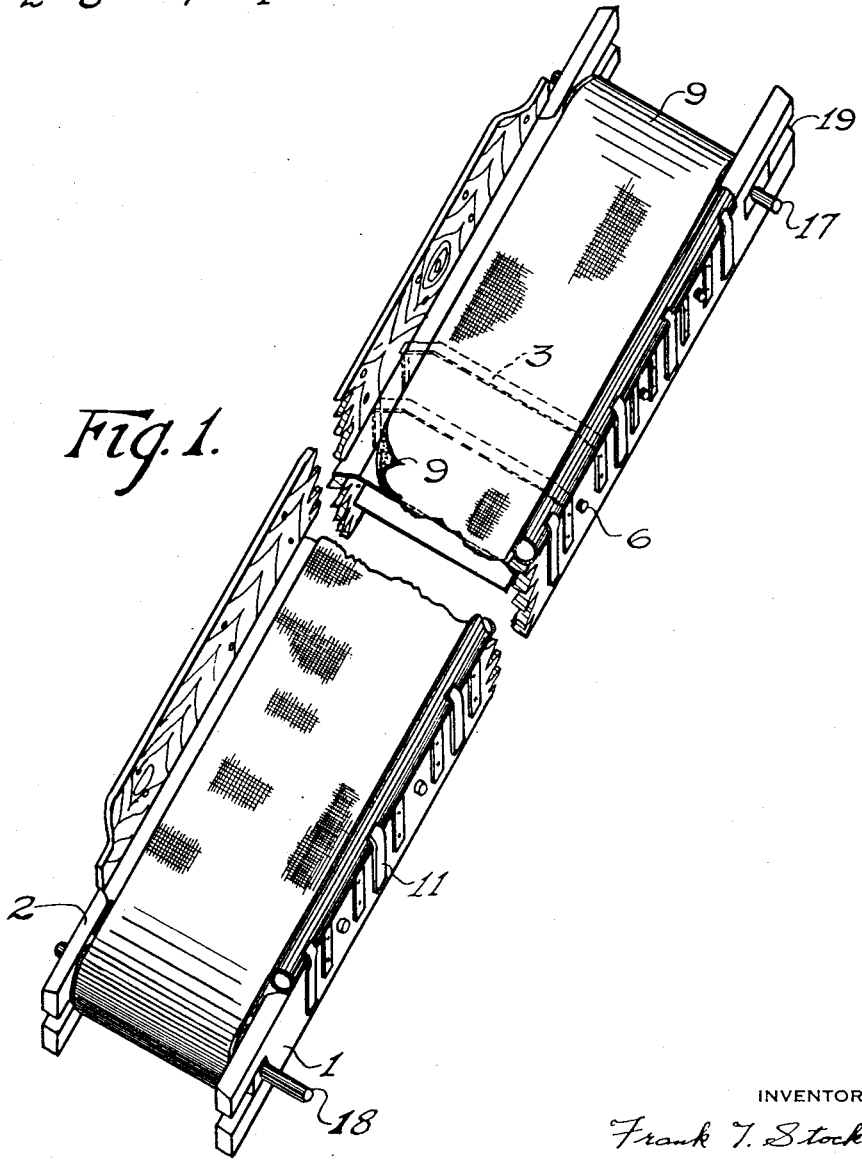
INVENTOR
Frank T. Stockdale
by William B. Jaspert
Attorney.

Patented Mar. 6, 1934

1,949,847

UNITED STATES PATENT OFFICE 1,949,847

COAL CONVEYER

Frank T. Stockdale, Frostburg, Pa.

Application July 23, 1932, Serial No. 624,187

2 Claims. (Cl. 198—204)

This invention relates to coal conveyers, more particularly to the type of conveyers for transferring coal from the digging compartments to the main conveyer, such conveyers being known in the trade as "face" conveyers, and it is among the objects of this invention to provide an endless belt conveyer of simple construction which shall be of minimum weight and which shall be adapted to be readily portable.

The type of face conveyers heretofore constructed were either of the type wherein the conveyer belt lies in a straight horizontal plane or where the conveyer has been made concave by supporting it on a dished or hollow surface, and both of these types have been faulty in their operation because of the fact that wet coal and small coal particles constantly creep below the belt and become lodged between the conveyer belt and its supporting surface, finally clogging up the rolls causing the belt to stretch, with the consequent breakage and distortion of conveyer parts.

The present invention is designed to overcome the difficulties of the prior art conveyers by supporting the conveyer belt in such manner that the coal particles or dust cannot lodge or build up on the conveyer support.

This is accomplished by making the belt supporting surface, which is commonly of sheet iron, of such shape, that the edges of the conveyer belt are inclined or flared downwardly when the belt is loaded thereby making the creeping of coal dust or particles underneath the belt an impossibility.

The invention will become more apparent from a consideration of the accompanying drawing, constituting a part hereof in which like reference characters designate like parts and in which:

Figure 1 is a view in perspective of an endless face conveyer embodying the principles of this invention;

Figure 2 is a cross-sectional view thereof; and,

Figure 3 a cross-sectional view of a slightly modified form of conveyer.

With reference to the several figures of the drawing, the structure therein illustrated comprises a pair of side frame members designated by the reference characters 1 and 2 which consist of wood or channel members that are provided with transverse straps or tie rods 3 on which is supported a sheet iron apron 4, the apron and the members 3 being inclined for a portion of their edges, as shown by the downwardly depending portion 5.

Disposed at intervals between the side frames 1 and 2 are a plurality of tie-rods 6 on which are mounted rollers 7 that constitute supports for the return strands 8 of an endless conveyor belt 9, the upper strand of the belt being secured on the sheet iron apron 4. The belt is of greater width than the straight or horizontal portion of the apron 4 so that the edges of the belt are free to follow the inclination of the depending portion 5 when the conveyer is loaded.

Disposed at intervals along the frames 1 and 2 are a plurality of straps 10 and 11, the straps 10 being fastened by cap bolts 12 and 13 to the side frame 2 and a side rail 14, the latter functioning as a retaining wall for mounting the coal on the conveyer member 9. The straps 11 are secured to a tubular member such as a pipe 15 which also function as a retaining member but is lower than the rail 14 to constitute the loading side from which the coal is shoveled or placed on the belt 9.

A clearance 16 is provided between the side rails 14 and 15 to permit the free displacement of any powderous materials that may accumulate on the belt 9, thereby preventing any drag on the conveyer belt and further preventing the accumulation of the powderous material in the regions adjacent the edge of the belt 9.

In operation the conveyer is placed with the side rail 14 remote from the operator who, in shovelling the coal on the conveyer, dumps it on the conveyer and the lumps or larger particles which do not stop on the center of the conveyer belt will fall against the side rail 14 and either travel longitudinally with the belt or be thrown back towards the center of the belt.

In the construction shown in Figure 3, the board type of side rail 14 is employed on both sides of the side frame members 1 and 2, this being an alternate form of construction which may be utilized where the conveyer is loaded from two sides or it may be utilized if found more convenient than the round iron pipe of rail of Figures 1 and 2.

The endless conveyer belt 9 is operated in a conventional manner by passing it around end drums 17 and 18, one of which is driven by a motor or other prime-mover and the usual provision may be made for maintaining the conveyer belt 9 under tension by providing adjustment of the drive rolls or drums 17 and 18 longitudinally of the frame members 1. For this purpose, slots 19 are provided in the end of the side frame members.

From the foregoing description of the conveyer structure it is obvious that on account of the downwardly flaring support or apron 14, the edges of the belt 9 will conform themselves to the flaring portion of the belt support especially when the belt is loaded so that the powderous materials or smaller particles cannot work themselves underneath the edges of the belt and accumulate on the supporting apron 4 as is common in the prior art devices. By providing the clearance 16 which may be one-half inch, more or less, the powderous material cannot accumulate between the conveyer and the side rails 14, thus further reducing the possibilities of the material creeping underneath the belt, as hereinbefore described.

By preventing the creeping of the powderous material below the conveyer belt 9, it is apparent that the entire conveyer structure will be subjected to less strain, can be constructed of lighter materials than conveyers which are subjected to the abuse hereinbefore mentioned, and can be operated with less power, thus rendering the present device more economical as well as productive of greater efficiency in operation.

Although one embodiment of the invention has been herein illustrated and described, it will become obvious to those skilled in the art that various modifications may be made in the details of construction without departing from the principles herein set forth.

I claim herein as my invention:

1. An endless conveyer structure comprising a plurality of side frames having an apron supported thereon, said apron having a central level supporting surface of substantial width extending longitudinally of the side frames and having its parallel side edges flared downwardly, and an endless conveyer belt mounted to have its load bearing strand supported mainly upon the level surface of said apron and partially upon the flared side edges thereof, said supporting apron and belt having substantial clearance with the side frames to prevent binding of the belt and to subject the belt to a load across substantially its entire width.

2. An endless conveyer structure comprising a plurality of side frames having an apron supported thereon, said apron having a central level supporting surface of substantial width extending longitudinally of the side frames and having its parallel side edges flared downwardly, an endless conveyer belt mounted to have its load bearing strand supported mainly upon the level surface of said apron and partially upon the flared side edges thereof, and side rail members in spaced relation with said apron and the edges of said belt to provide a substantial clearance for the escape of powderous material therebetween.

FRANK T. STOCKDALE.